May 17, 1938.      H. BENDER ET AL      2,117,596
GLASS ELECTRODE
Filed May 20, 1936
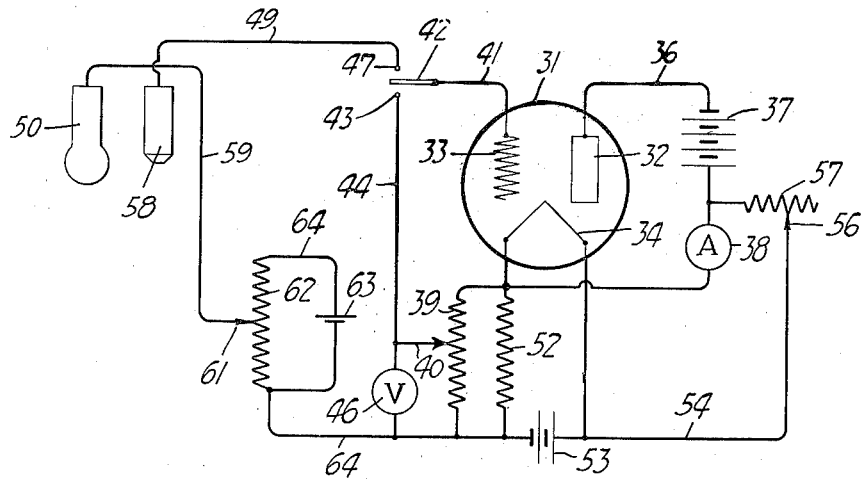
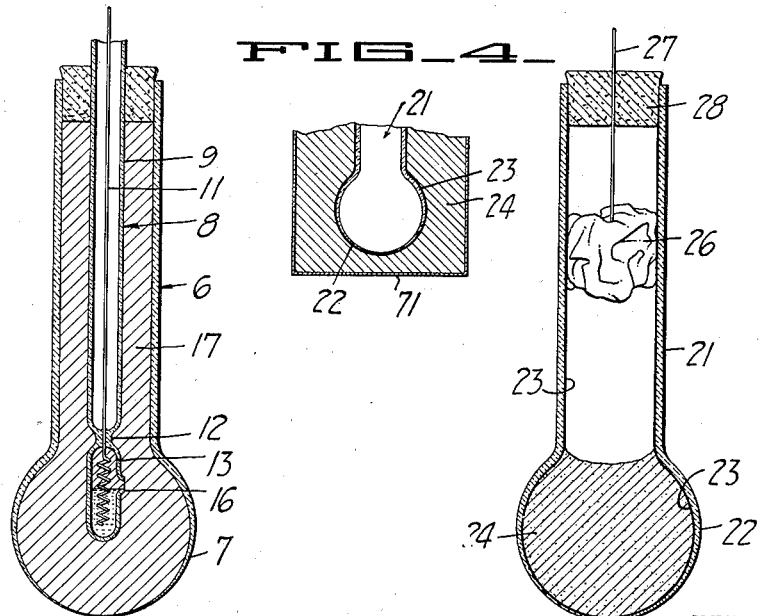
INVENTORS
Harry Bender
David J. Pye
BY Robert H. Eckhoff
ATTORNEY Patented May 17, 1938

2,117,596

UNITED STATES PATENT OFFICE 2,117,596

GLASS ELECTRODE

Harry Bender, Antioch, and David J. Pye, Pittsburg, Calif.

Application May 20, 1936, Serial No. 80,814

4 Claims. (Cl. 204—5)

The present invention relates to an improvement in devices for measuring pH values and, more particularly, to an improvement in a glass electrode.

The appreciation of the importance of pH as a governing or influencing factor in laboratory and industrial chemical processes has been gaining momentum very rapidly during the past few years. Heretofore the fact that many reactions are necessarily on the acid or alkaline side has been taken at its face value but the present trend is to study and utilize correct pH control which in many cases allows better yields or imparts definite desirable physical properties to the product. Indeed, in some cases it has been found that rigid pH control is the only means of making some reactions commercially possible. The modern classic example of this is the Ethyl Dow Plant at Wilmington, North Carolina (Stewart, L. C. "Commercial Extraction of Bromine from Sea Water", Ind. and Eng. Chem., 26,361–69, 1934), where the production of bromine from sea water is made possible only through accurate pH control between very definite limits.

The problem of pH measurement has not been any easy one and it has only been since the discovery of the glass electrode by Haber (Haber and Kemensiewicz, Z. physick. Chem., 67,385, 1909), and its subsequent development by MacInnes and Dole (MacInnes, D. A. and Dole, M. Ind. & Eng. Chem. Analytical Ed., 1,57–9, 1929), and other workers that the problem has been satisfactorily solved.

The usual indicators are subject to oxidation and reduction and are useless in colored solutions. The technique of the hydrogen electrode is difficult and the electrode itself has many limitations caused by oxidation and reduction potentials. The antimony and other oxidation-reduction electrodes are subject to narrow ranges and are not reliable in solutions of unknown composition. The glass electrode suffers from none of these limitations. It is not affected by color, turbidity, oxidation or reduction and it has a wide useful range of from zero to approximately 10.5 pH. However, it does have the disadvantage of possessing an internal resistance of at least three megohms which fact requires a rather sensitive means of potential measurement.

Though the potential of the glass electrode may be measured by ordinary potentiometric methods, the galvanometer must be very sensitive and is consequently subject to such annoyances as vibration and sluggishness. The most satisfactory means of measurement has been found to be the vacuum tube voltmeter because of its rapidity of response and its extremely high grid resistance which allows potentials to be measured without drawing any current from the potential source. The vacuum tube voltmeter permits the use of relatively insensitive current indicators which makes possible a desirable degree of stability and ruggedness and also makes possible a degree of portability and compactness not obtainable by any other method—see Goode, Jour. Am. Chem. Soc. 1922, 44—26.

The instrument is featured by its simplicity of operation, durability, compactness, portability and reliable accuracy. The vacuum tube serves only as a null indicator which eliminates any errors introduced by changing tube characteristics and varying battery voltages. The general principle of operation is to apply the unknown voltage of the electrode to the grid of the tube and note the plate current flowing in the circuit. A variable known voltage is then applied to the grid and adjusted until the plate current of the unknown conditions is duplicated. The variable known voltage is then equal to the potential of the glass electrode and is read on an ordinary voltmeter. Since the reference potentials in the electrode systems are never reliably constant over a long period of time and with hard unskilled usage, provisions have been made to standardize the instrument against a standard buffer at the beginning of a series of measurements or at the beginning of the day. This arrangement makes possible the calibration of the meter scale directly in pH units and permits a high degree of flexibility both in pH ranges available and in the use of various types of electrodes. The speed and accuracy of this system is such that an unskilled operator may make a pH measurement accurate to 0.1 pH in approximately fifteen seconds or less. The life of the batteries which are entirely self contained is equal to their shelf life or at least one year.

In practice, we have found that the glass electrode is subject to failure because of its fragility. As is well known, a glass electrode comprises a glass tube having one end closed by a bulb blown thereon and so thin as to be capable of transmission of electricity. This bulb is usually thinner than paper and is therefore so fragile that the life of an ordinary electrode, even with great care, is relatively short. In attempting to introduce glass electrodes into industry and industrial applications we have found that by constructing the electrode in accordance with this invention this life can be increased many times. We have successfully used glass electrodes embodying our invention for six months and more. In several instances we have placed in the hands of relatively unskilled workers glass electrodes to be utilized by them in pH measurements. While the electrode of our invention embodies all the principles of the electrode as finally developed by the original workers, it is nevertheless so rugged and strong that the electrode life is increased many times and, in at least one instance, the electrode was successfully used for a period of a year. Another instance, we have been able to successfully utilize the glass electrode by placing it directly in a flowing stream of a material. For example, we have successfully used a glass electrode by placing it directly in a pulp stream in a paper mill to enable pH measurements to be taken so that successful bleaching of the pulp can be conducted. This is a most remarkable assistance in connection with bleaching inasmuch as it enables an accurate pH measurement to be taken instantly and at any time while the pulp is undergoing bleaching.

It is in general the object of the present invention to improve upon equipment utilized in pH measurement.

Another object of the invention is to improve upon glass electrode structure.

The invention includes other objects and features of advantage, some of which, together with the foregoing, will appear hereinafter wherein the present preferred form of the invention is disclosed.

In the drawing accompanying and forming a part hereof, Figure 1 is a circuit diagram of an apparatus useful for determination of the pH value of our invention.

Figure 2 is a view, partly in section, taken through a reference electrode embodying the present invention.

Figure 3 is a section taken through another electrode of a simple form and also embodying features of this invention.

Referring first to the glass electrode structures and more particularly to Figure 2, we have shown an electrode structure generally designated as 6 and made up of a glass tube having a bulb 7 blown thereon so as to be very thin. The material for construction of the glass electrode has been developed particularly by MacInnes and Dole and the discussion in the aforementioned article by these authors will suffice upon this point. The bulb 7 is even thinner than paper thin and is so fragile that a slight jar or bump will result in its fracture. Within the tube 6 and extending down into the bulb 7 is a reference electrode indicated generally at 8. This reference electrode includes a glass tube 9 through which extends a noble metal conductor 11, the conductor being sealed in the tube as at 12 by constricting the tube. The bottom portion of the tube is formed with an open bulb structure 13 into which the conductor 11 extends. An opening 16 is provided in the bottom portion of the reference electrode and into this cavity is inserted a suitable material such as quinhydrone. Ordinarily the intervening space is filled with an electrolyte such as a potassium chloride or a hydrochloric acid solution. In accordance with this invention we provide means for backing up the fragile portion of the glass electrode and particularly a filling means 17 having such properties that temperature variations do not cause it to affect adversely the thin bulb structure. As a suitable filling material we have made up a gel of sodium silicate adding sufficient hydrochloric acid to give an excess which results in the gel being 0.1N in hydrochloric acid. The gel is preferably made up to have a long setting time, a couple of days. This electrode proves satisfactory in use and is quite successful.

As another filling material we have used sodium silicate and added calcium hydroxide thereto, thus achieving a filling material which, while a gel, nevertheless had approximately the same composition as the glass.

We can use other materials, such as agar-agar although this material does not have a long life inasmuch as it is subject to mold. Other filling materials can be used and these will be discussed at length hereinafter.

In Figure 3 we have shown a very rugged electrode structure wherein a glass tube 21 is provided with a very thin walled bulb 22. The inside of the tube is coated with a suitable metallic coating such as silver 23 to provide a suitable electrical contact. The bulb proper and a portion of the tube is filled with a filling material indicated as 24. Connection to the metal coating on the inside of the tube is made by inserting a compressed piece of tinfoil 26 to which a conductor 27 is attached, the conductor being led off through cork 28 inserted in the tube.

The filling material 24 in the bulb 22 can be any suitable solid having substantially the same coefficient of expansion as that of the glass and which does not materially expand or contract upon being deposited inside of the bulb. As a suitable material we have used plasticized stationer's sealing wax, the ordinary red sealing wax, plasticizing this by melting it and adding about 10% of dibutyl phthalate. Any other resinous material, solid at the temperature at which the electrode is to be used can be employed. If the resinous material is not sufficiently plastic in itself it can be plasticized by the addition of a suitable plasticizer. If the material is not plastic and if it shrinks too much upon cooling, it may tear the silver coating loose from the interior of the tube. This is of course undesirable. Metal alloys of suitable physical characteristics are useful as are amalgams.

The glass electrode structures disclosed can be used in any material except those which will attack the glass itself. They can be used through the range of pH values, even in such strong acids or alkalies that ordinarily are not dealt with.

Figure 1 shows a diagrammatic circuit of the device utilized in conjunction with the glass electrode. A vacuum tube 31 is provided including the usual plate 32, grid 33 and filament 34. Plate 32 is connected by a conductor 36 to a battery 37 and with an ammeter 38 and a potentiometer 39. Grid 33 is connected by conductor 41 to switch blade 42. This blade is movable between the two positions in which it engages a contact 43 connected by conductor 44 to a volt meter 46. The other contact 47 is connected by conductor 49 to the reference electrode 58.

Filament 34 is in series with a resistance 52 and a battery 53, one side of the filament circuit being connected by conductor 54 to a resistance slider 56 cooperating with resistance 57 one end of which is connected to conductor 36. The glass electrode 50 is connected by a conductor 59 to a potentiometer slider 61 cooperating with a resistance 62 which is connected across a battery 63 and to the other side of the volt meter 46 through conductor 64.

In use it will be found that each glass electrode varies slightly from any other and because of this a given electrode is calibrated in the circuit disclosed with reference to a standard buffer solution having a known pH value. When the electrodes 50 and 58 are inserted in this standard solution and with switch blade 42 engaging contact 43 the voltmeter 46 which can be calibrated directly in pH is set to the pH of the standard solution by means of slider 40. The reading secured on ammeter 38 is now noted and the switch blade 42 is moved to engage contact 47. Slider 61 is adjusted until the reading of ammeter 38 duplicates the reading at its first setting. If necessary the polarity of battery 63 may be reversed to make possible the duplicate readings of ammeter 38.

In operating upon an unknown the electrodes 50 and 58 are placed in contact with the unknown liquid and switch plate 42 is brought into contact with contact 47. The switch blade 42 is then moved to engage contact 43, the ammeter reading having been previously noted. Under these conditions the slider 40 is adjusted until an identical reading is secured upon meter 38, the volt meter then indicating the pH value directly of the unknown solution.

Although we prefer to use the vacuum tube voltmeter to measure the potentials developed by the glass electrode and associated reference half cell we do not wish to be limited to this means of measurement. Any means such as the Compton or Lindemann electrometer, ballistic galvanometer using condensers or a high sensitivity potentiometer may be used with our electrode without departing from the spirit of our invention.

In practice, with a vacuum tube 31 requiring a filament voltage of six volts and a plate voltage of ninety, we preferably reduce this to ensure an absence of ionization effects in the tube making the system erratic. We have done this by avoiding ionization, reducing the respective voltages of batteries 53 and 37 to three and thirty-six volts.

The structures shown can be reversed. That is, for example referring to Figure 4, the metal coating 23 can be placed on the outside of the tube 21 and bulb 22 and the interior left unoccupied. The filler 24 is then inserted between the auxiliary support vessel 71 and the outside of the tube. The material to be examined is then inserted in the bulb and the reference electrode or half-cell 58 inserted therein. Such a structure, while useful, is limited in utility as compared to that of Figure 3 since the material to be examined must be inserted and withdrawn from the bulb.

Instead of the plastic filling of the entire space, the plastic can be inserted and as soon as it has coated the bulb the remaining liquid can be poured out. This leaves a solid supporting shell on the bulb.

We claim:

1. A pH measuring electrode structure having in combination a glass tube terminating in a bulb so thin as to be ion permeable, a metal coating on the inner surface of said bulb, electrical connecting means for establishing connection to said coating, and a solid filler backing up said bulb and having substantially the same coefficient of expansion as said glass.

2. A pH measuring electrode structure having in combination a glass tube terminating in a bulb so thin as to be ion permeable, a metal coating on the inner surface of said bulb, electrical connecting means for establishing connection to said coating, and a solid filler of plasticized sealing wax backing up said bulb and having substantially the same coefficient of expansion as said glass.

3. A pH measuring electrode structure having in combination a glass tube terminating in a bulb so thin as to be ion permeable, a metal coating on the inner surface of said bulb, electrical connecting means for establishing connection to said coating, and a solid filler composed of an amalgam backing up said bulb and having substantially the same coefficient of expansion as said glass.

4. A pH measuring electrode structure having in combination a glass tube terminating in a bulb so thin as to be ion permeable, a metal coating on the inner surface of said bulb, electrical connecting means for establishing connection to said coating, and a gel filler backing up said bulb and having substantially the same coefficient of expansion as said glass.

HARRY BENDER.
DAVID J. PYE.